US008955568B2

(12) United States Patent
Matsuzawa

(10) Patent No.: US 8,955,568 B2
(45) Date of Patent: Feb. 17, 2015

(54) TIRE FOR CONSTRUCTION VEHICLE

(75) Inventor: Kazutaka Matsuzawa, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 128 days.

(21) Appl. No.: 13/387,189

(22) PCT Filed: Jul. 27, 2010

(86) PCT No.: PCT/JP2010/004776
§ 371 (c)(1),
(2), (4) Date: Jan. 26, 2012

(87) PCT Pub. No.: WO2011/013357
PCT Pub. Date: Feb. 3, 2011

(65) Prior Publication Data
US 2012/0118461 A1    May 17, 2012

(30) Foreign Application Priority Data

Jul. 27, 2009 (JP) .................................. 2009-174531
Jul. 27, 2010 (JP) .................................. 2010-167891

(51) Int. Cl.
*B60C 9/28* (2006.01)
*B60C 9/18* (2006.01)
(Continued)

(52) U.S. Cl.
CPC ......... *B60C 11/0316* (2013.04); *B60C 11/0311* (2013.04); *B60C 11/0306* (2013.04); *B60C 9/28* (2013.01); *B60C 2200/065* (2013.04);
(Continued)

(58) Field of Classification Search
CPC .................. B60C 2009/1871; B60C 2200/065; B60C 2200/06; B60C 9/28; B60C 11/0306

USPC ............... 152/209.12, 209.27, 526, 535, 538
See application file for complete search history.

(56) References Cited

U.S. PATENT DOCUMENTS 5,318,643 A * 6/1994 Mizner et al. .................. 152/527
5,323,825 A * 6/1994 Yamagishi et al. ...... 152/209.21
(Continued)

FOREIGN PATENT DOCUMENTS

CN    101193762 A    6/2008
JP    H10-250314 A    9/1998
(Continued)

OTHER PUBLICATIONS

English machine translation of JP11-078422, no date.*
(Continued)

*Primary Examiner* — Justin Fischer
*Assistant Examiner* — Robert Dye
(74) *Attorney, Agent, or Firm* — Sughrue Mion, PLLC

(57) ABSTRACT

A tire for a construction vehicle according to the present invention provides a tire for a construction vehicle having a belt formed by plural layers on the radially outer side of a crown portion of a carcass toroidally extending between a pair of bead portions, in which
an outermost belt layer located on the radially outermost side of the belt has a width of 50% or more of a tread width, and
a narrow groove is provided such that a distance between an end portion of the outermost belt layer and a bottom portion of the narrow groove is in the range of 15% to 100% of a tread thickness T, where T is a tread thickness at the end portion of the outermost belt layer.

11 Claims, 11 Drawing Sheets

(51) Int. Cl.
*B60C 11/117* (2006.01)
*B60C 11/11* (2006.01)
*B60C 11/03* (2006.01)

(52) U.S. Cl.
CPC . *B60C2011/0033* (2013.04); *B60C 2011/0348* (2013.04); *B60C 2011/0381* (2013.04)
USPC ............... 152/538; 152/209.12; 152/209.27; 152/535

(56) References Cited

U.S. PATENT DOCUMENTS

| | | | |
|---|---|---|---|
| 7,093,630 B2* | 8/2006 | Kimishima et al. | 152/209.14 |
| 8,517,071 B2* | 8/2013 | Suzuki | 152/209.27 |
| 2008/0289738 A1* | 11/2008 | Nakamura et al. | 152/209.24 |
| 2009/0126847 A1* | 5/2009 | Kobayashi | 152/527 |

FOREIGN PATENT DOCUMENTS

| | | | |
|---|---|---|---|
| JP | 11-078422 | * | 3/1999 |
| JP | 2001-301424 A | | 10/2001 |
| JP | 2001225608 | * | 10/2001 |
| JP | 2003136911 | * | 5/2003 |
| JP | 2004-075056 A | | 3/2004 |
| JP | 2004262295 | * | 9/2004 |
| JP | 2005104437 | * | 4/2005 |
| JP | 2006-213177 A | | 8/2006 |
| JP | 2007-191093 A | | 8/2007 |
| JP | 2008-114738 A | | 5/2008 |
| JP | 2008279976 | * | 11/2008 |
| WO | 2008056504 A1 | | 5/2008 |

OTHER PUBLICATIONS

English machine translation of JP2008-114738, no date.*
English machine translation of JP2001225608, dated Oct. 2001.*
English machine translation of JP2004262295, dated Sep. 2004.*
English machine translation of JP2005104437, dated Apr. 2005.*
English machine translation of JP2008279976, dated Nov. 2008.*
Haulage Truck Tire Catalog. [online]. The Goodyear Tire & Rubber Company, 2008 [retrieved May 2, 2013]. Retrieved from the Internet: <URL: http://www.goodyearotr.com/cfmx/web/otr/brochures/pdf/haulage_truck.pdf>.*
International Search Report of PCT/JP2010/004776, dated Oct. 5, 2010.
Extended European Search Report (EESR) dated Mar. 18, 2013 issued in European Application No. 10804108.8.
Chinese Office Action issued in Chinese Application No. 201080040024.X dated Sep. 29, 2013.
Office Action, dated Jan. 7, 2014, issued by the Japanese Patent Office in the corresponding Japanese Patent Application No. 2010-167891.
Chinese Office Action issued Apr. 29, 2014 in Chinese Patent Application No. 201080040024.
Communication from the Japanese Patent Office issued Jul. 1, 2014 in a counterpart Japanese Patent Application No. 2010-167891.
Communication from the State Intellectual Property Office of the People's Republic of China issued Oct. 31, 2014 in a counterpart Chinese Application No. 201080040024.X.

* cited by examiner

TIRE FOR CONSTRUCTION VEHICLE

CROSS REFERENCE TO RELATED APPLICATIONS

This application is a National Stage of International Application No. PCT/JP2010/004776 filed Jul. 27, 2010, claiming priority based on Japanese Patent Application No. 2009-174531 filed Jul. 27, 2009, and Japanese Patent Application No. 2010-167891 filed Jul. 27, 2010, the contents of all of which are incorporated herein by reference in their entirety.

TECHNICAL FIELD

The present invention relates to a tire for a construction vehicle, and in particular, to a tire for a construction vehicle having reduced heat-generation and suppressed occurrence of cracks at a belt end of an outermost layer.

RELATED ART

In recent years, with the increase in the size of the construction vehicles, tires have become increasingly larger and carried heavier load, and profiles thereof have been increasingly reduced. This posed a problem of heat generation at a tread center portion. To deal with this, as described, for example, in Patent Document 1, a technique has been developed, in which the tread center portion is provided with a narrow groove to improve the heat radiation property at the tread center portion of the tire.

RELATED ART DOCUMENT

Patent Document 1: Japanese Patent Application Laid-open No. 2007-191093

DISCLOSURE OF THE INVENTION

Problems to be Solved by the Invention

However, although the above-described improvement has been made for the tread center portion in which rise in temperature is larger, there has been no improvement for the heat generation in the vicinity of ends of a belt in the width direction of the tread where a heat radiation property is favorable and the rise in temperature is relatively small as compared with the tread center portion. Thus, temperatures especially in the vicinity of the ends of the belt are relatively higher than those at the tread center portion, and hence, a tread separation due to crack starting from the belt end has been increasing.

Further, in the tire for a construction vehicle traveling uneven terrains, a belt layer disposed on the outermost side is generally designed to be wider in order to protect a carcass. If a groove is provided in the vicinity thereof, a tread may detach due to a tread cut starting from the belt end, and hence, such a groove tends to be avoided.

In view of the circumstances described above, the present invention aims to solve the problems described above, and an object of the present invention is to provide a tire for a construction vehicle having improved heat radiation property in the vicinity of the outermost belt layer while suppressing the occurrence of cracks from the ends of the outermost belt layer.

Means for Solving the Problem

The present inventor made a keen study to solve the problems described above, and as a result, found that the cracks starting from the outermost belt layer is caused by a shearing strain in radial-width directions in cross section, which is a combination of a strain occurring when the vicinity of the belt ends is brought into contact with the road surface and are extended in the circumferential direction at the time when a load is applied to the tire during travel, and the belt contracts in the width direction in the road-contacting surface, and a strain occurring when the tread rubber is compressed and the tread is pushed out in the width direction. The present inventor further found that the heat generated at the tread at the time when the tire rotates accelerates the crack growth. Then, the present inventor investigated the measures for solving the problems described above, and as a result, found that, by disposing a narrow groove so as to correspond to an end of the outermost belt layer, it is possible to alleviate the pushing-out deformation of the tread to delay the occurrence of the crack starting from the end of the outermost belt layer, and improve the heat radiation property in this area to suppress the growth of the crack occurring from the end of the outermost belt layer.

Further, the present inventor made a keen study on behavior of the road-contacting surface of the tire, and found that: in particular, in the tire for a construction vehicle having a belt having increased rigidity especially in the circumferential direction, a deformation of the tread rubber in the radial direction increases at the time of applying a standard inner pressure with the vicinity of the center of the half width of the tread in the tread width direction being a center of the deformation; and with this behavior, in an area of the tread in the range of 25% to 50% of the tread half width measured from the end portion of the tread, the road-contacting surface of the tire tends to be brought into contact with the ground on the inner side in the width direction of the tread.

Then, the present inventor found that, by positioning the end portion of the outermost belt layer at a position nearer to the center than the position located away from the end portion of the tread by 25% of the tread half with, it is possible to further alleviate the pushing-out deformation of the tread, which generally acts outwards in the width direction, to further suppress the shearing strain in radial-width directions in cross section.

Further, by positioning the narrow groove at a position nearer to the center than the position away from the end portion of the tread by 25% of the tread half width, it is possible to cause a force acting in the direction in which the narrow groove closes at the time when the tire is brought into contact with the road surface, whereby it is possible to suppress the occurrence and the growth of the cracks at a groove bottom.

Main configurations of the present invention for solving the problems above are as follows:

(1) A tire for a construction vehicle having a belt formed by plural layers on the radially outer side of a crown portion of a carcass toroidally extending between a pair of bead portions, in which an outermost belt layer located on the radially outermost side of the belt has a width of 50% or more of a tread width, and a narrow groove is provided such that a distance between an end portion of the outermost belt layer and a bottom portion of the narrow groove is in the range of 15% to 100% of a tread thickness T, where T is a tread thickness at the end portion of the outermost belt layer.

(2) The tire for a construction vehicle according to (1) described above, in which the end portion of the outermost belt layer is located nearer to the center in the width direction of a tread than a position spaced away from an end portion of the tread by 25% of a tread half width.

(3) The tire for a construction vehicle according to (1) above, in which the narrow groove extends in the circumferential direction of a tread.

(4) The tire for a construction vehicle according to (1) above, in which the narrow groove extends in the width direction of the tread.

(5) The tire for a construction vehicle according to (3) above, in which the narrow groove is located nearer to the center in the width direction of the tread than a position spaced away from an end portion of the tread by 25% of a tread half width.

(6) The tire for a construction vehicle according to any one of (1) to (5) above, in which a ratio GW/D of a width GW relative to a depth D falls in the range of 5% to 25%, where GW is a width of an opening of the narrow groove, and D is a depth of the narrow groove.

(7) The tire for a construction vehicle according to (3) above, in which the narrow groove is formed within a land portion defined by a lateral groove.

(8) The tire for a construction vehicle according to (3) or (7) above, in which the narrow groove is inclined from the bottom portion of the narrow groove to a tread surface toward the outer side of the vehicle at the time when the tire is assembled to the vehicle.

Effect of the Invention

According to the present invention, by positioning the narrow groove at an appropriate position corresponding to the end portion of the outermost belt layer, it is possible to alleviate the pushing-out deformation of the tread while enhancing the heat radiation property, whereby it is possible to suppress the occurrence and the growth of the crack starting from the belt end of the outermost layer to prevent the tread separation due to the crack.

BEST MODE FOR CARRYING OUT THE INVENTION

Hereinbelow, with reference to FIG. 1, a first embodiment according to the present invention will be described in detail.

Figure 1:
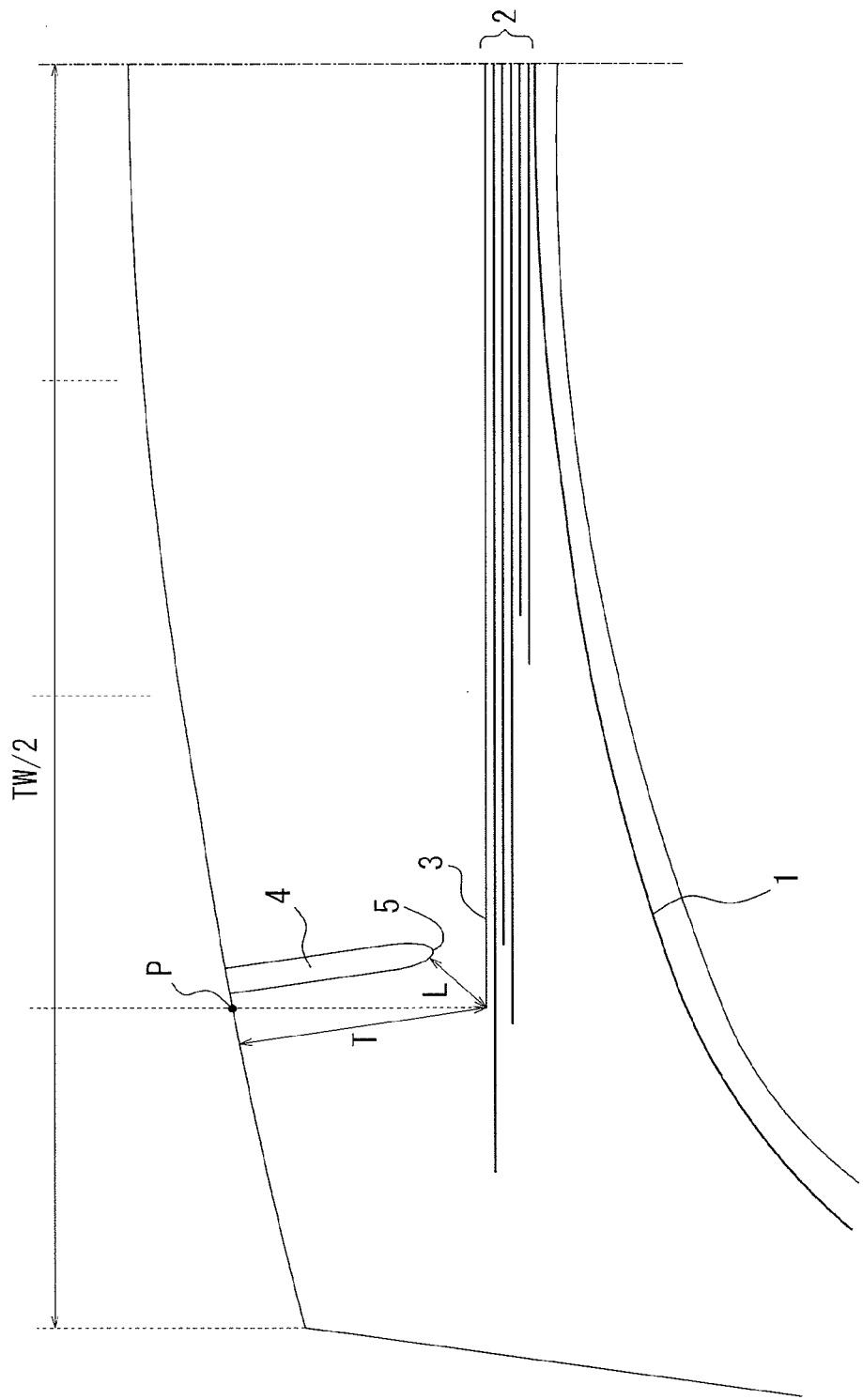
FIG. 1 is a sectional view illustrating a tire having a narrow groove provided in the tire circumferential direction.

As illustrated in FIG. 1, a tire for a construction vehicle according to the present invention (hereinafter, referred to as "tire") includes a carcass 1 toroidally extending between a pair of bead cores (not illustrated).

On the radially outer side of a crown portion of the carcass 1, a belt 2 formed by plural belt layers (six layers in the example illustrated in the drawing) is provided. Of the plural belt layers, a belt layer located on the outermost side in the tire radial direction is referred to as an outermost belt layer 3. In this specification, T represents a length of a perpendicular line drawn from an end portion of the outermost belt layer in the tire radial direction to a tread surface.

In the example in the drawing, the outermost belt layer 3 is wider than that of the first and the second belt layers counting from the inner side in the tire radial direction, and the second belt layer counting from the outer side in the tire radial direction is the widest belt layer.

Further, a narrow groove 4 extending in the circumferential direction of the tread is provided at a position corresponding to the outermost belt layer 3 of the tread. More specifically, a distance L between an end portion of the outermost belt layer 3 and a bottom portion 5 of the narrow groove is set so as to fall within the range of 15% to 100% of a tread thickness T of the end portion of the outermost belt layer.

In this specification, the distance L between the end portion of the outermost belt layer 3 and the bottom portion 5 of the narrow groove represents the shortest distance between the end point of the outermost belt layer 3 and the bottom portion 5 of the narrow groove. The "point" in the term "end point" means a central position of a thickness of the line. The term "bottom portion" means a bottom surface in the case where the bottom surface of the narrow groove is flat, and means a curved portion in a surface protruding inward in the radial direction and serving as a boundary between the narrow groove and the tread in the case where the bottom surface of the narrow groove is a curved surface. Further, the term "narrow groove" represents a groove having a depth three times or more larger than a width of an opening thereof.

It should be noted that the outermost belt layer 3 has a width larger than 50% or more of a tread width TW, and in the example illustrated in the drawing, the end portion of the outermost belt layer is located at a position corresponding to a point P located away from the end portion of the tread in the width direction of the tread by 25% of the tread half width. The expression "located at a position corresponding to a point P" means being located on a line passing through the point P and extending in parallel to the tire radial direction in a cross section in the tire width direction.

Further, in the example illustrated in the drawing, inclined angles of the first and the second belt layers counted from the inner side in the tire radial direction with respect to the tire circumferential direction are smaller than the inclined angle of the outermost belt layer 3 with respect to the tire circumferential direction.

Figure 2:
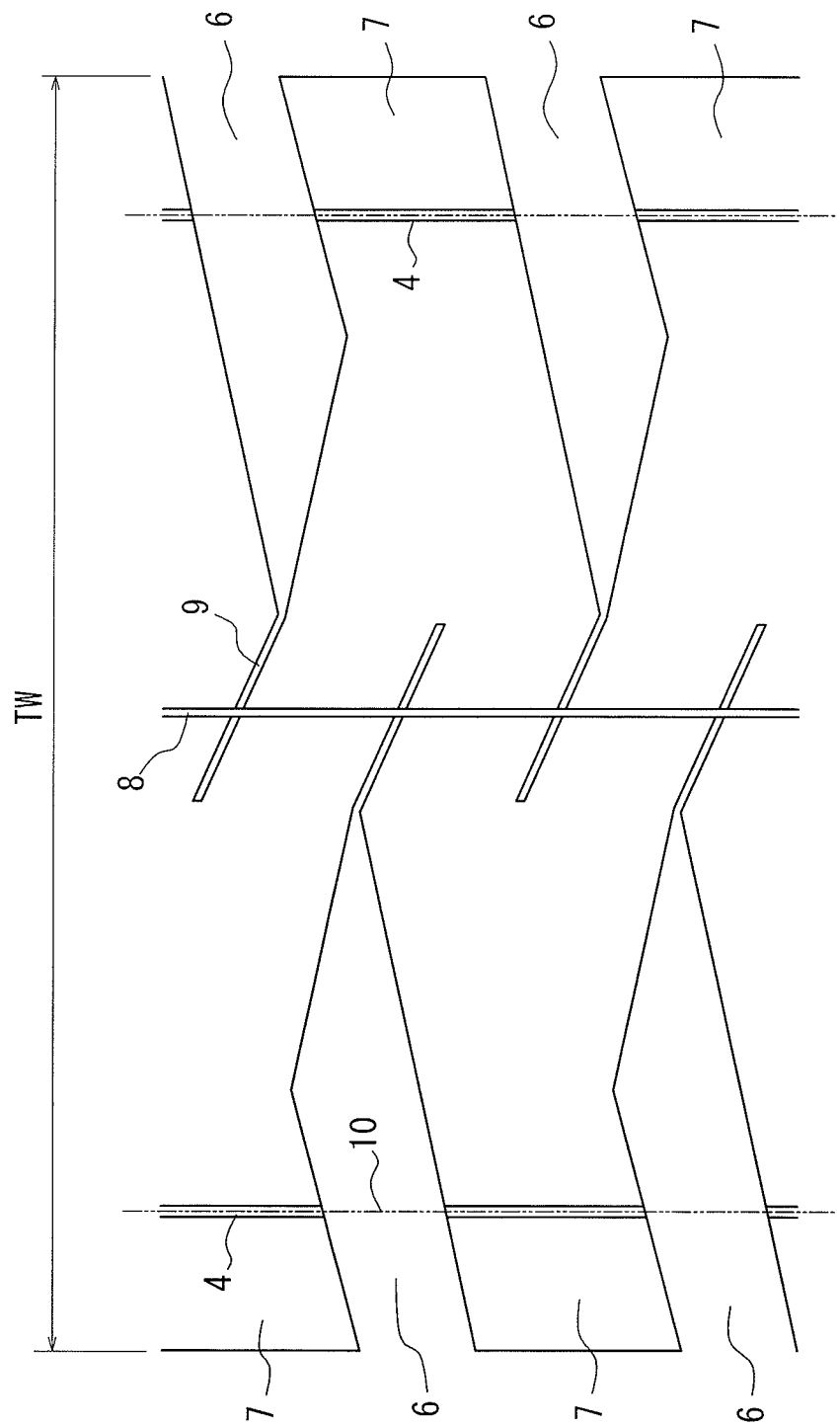
FIG. 2 is a plan view illustrating a tread portion of a tire having the narrow groove provided in the tire circumferential direction.

FIG. 2 is a plan view illustrating a tread portion of a tire according to a first embodiment of the present invention. As illustrated in FIG. 2, the tread portion has plural lateral grooves 6 extending from a tread end toward a tire equator up to an area adjacent to the tire equator and each having a tapered shape, and a phase difference is applied in the circumferential arrangement between the lateral grooves 6 on one end side of the tread and those on the other end side of the tread. The lateral grooves 6 section the tread surface to form lugs 7.

Further, the tread center portion is provided with a central circumferential groove 8 extending on the tire equator and having a narrow width, and crossing grooves 9 extending in a direction intersecting the tire equator and continuing alternately to the lateral groove 6 on the one side of the tread and the lateral groove 6 on the other side of the tread.

It should be noted that, although FIG. 2 illustrates that each of the crossing grooves 9 has a depth larger than that of the central circumferential groove 8, it may be possible to set both depths equal to each other, or to set the depth of the central circumferential groove 8 greater.

Further, on the tread portion, the narrow groove 4 is provided in the vicinity of an end portion 10 of the outermost belt layer. The specific positional relationship between the end portion 10 of the outermost belt layer and the narrow groove 4 is as described above. The narrow groove 4 is provided such that the distance L between the end portion of the outermost belt layer and the bottom portion 5 of the narrow groove 4 falls within the range of 15% to 100% of the tread thickness T at the end portion of the outermost belt layer. In FIG. 2, the narrow groove extending in the circumferential direction has a straight line shape. However, the narrow groove may extend in a zigzag shape. Further, in FIG. 2, the narrow groove 4 connects with the lateral groove 6. However, it may be possible that the narrow groove 4 does not connect with the lateral groove 6.

With the narrow groove 4, it is possible to alleviate the pushing-out deformation of the tread to delay the occurrence of the crack starting from the end of the outermost belt layer, and it is possible to improve the heat radiation property in this area to suppress the growth of the crack occurring from the end of the outermost belt layer. The reason that the narrow groove 4 is provided in the above-described range is that, in the case where the distance is less than 15%, the crack occurring at the belt end is likely to connect with the bottom portion 5 of the narrow groove, which leads to an increase in troubles. In the case where the distance exceeds 100%, the effect of improving the heat radiation property cannot be obtained although a minor effect of suppressing the pushing-out deformation can be obtained, and hence, the effect obtained from the present invention reduces.

It should be noted that the reason that the width of the outermost belt layer 3 is set to 50% or more of the tread width TW is that the protection for the carcass is not sufficient in the case where the width is less than 50%.

Further, the tire for a construction vehicle is required to have a significantly high rigidity in the circumferential direction, and hence, it is preferable that one or more belt layers other than the outermost belt layer are inclined at an angle of 10° or lower with respect to the tire circumferential direction.

By extending the narrow groove in the circumferential direction of the tire as described above, the significant effect can be obtained in that the air flow during the traveling of the vehicle (hereinafter, referred to as traveling airflow) increases to enhance the heat radiation property.

Figure 3:
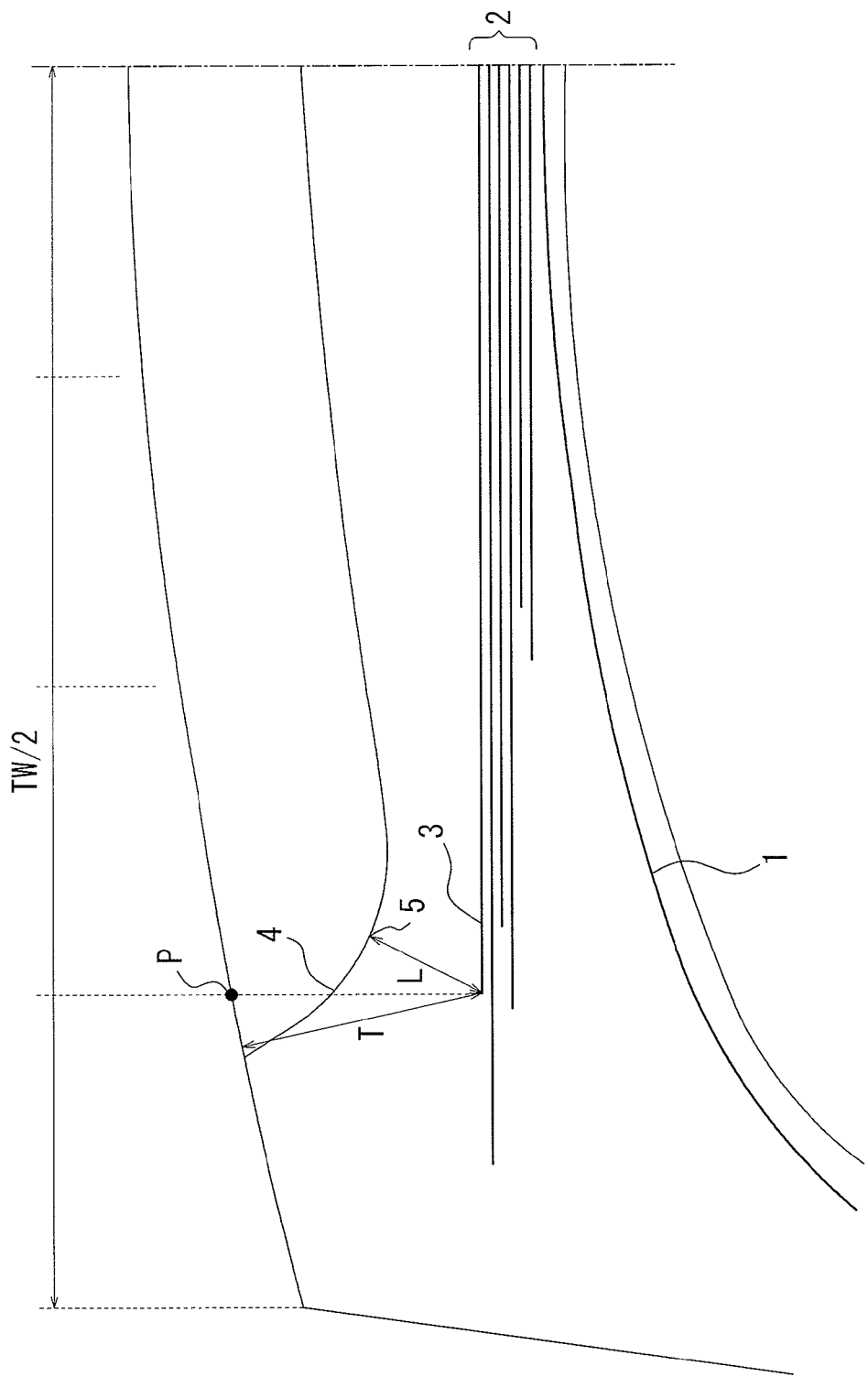
FIG. 3 is a sectional view of a tire having the narrow groove provided in the tire width direction.
Figure 4:
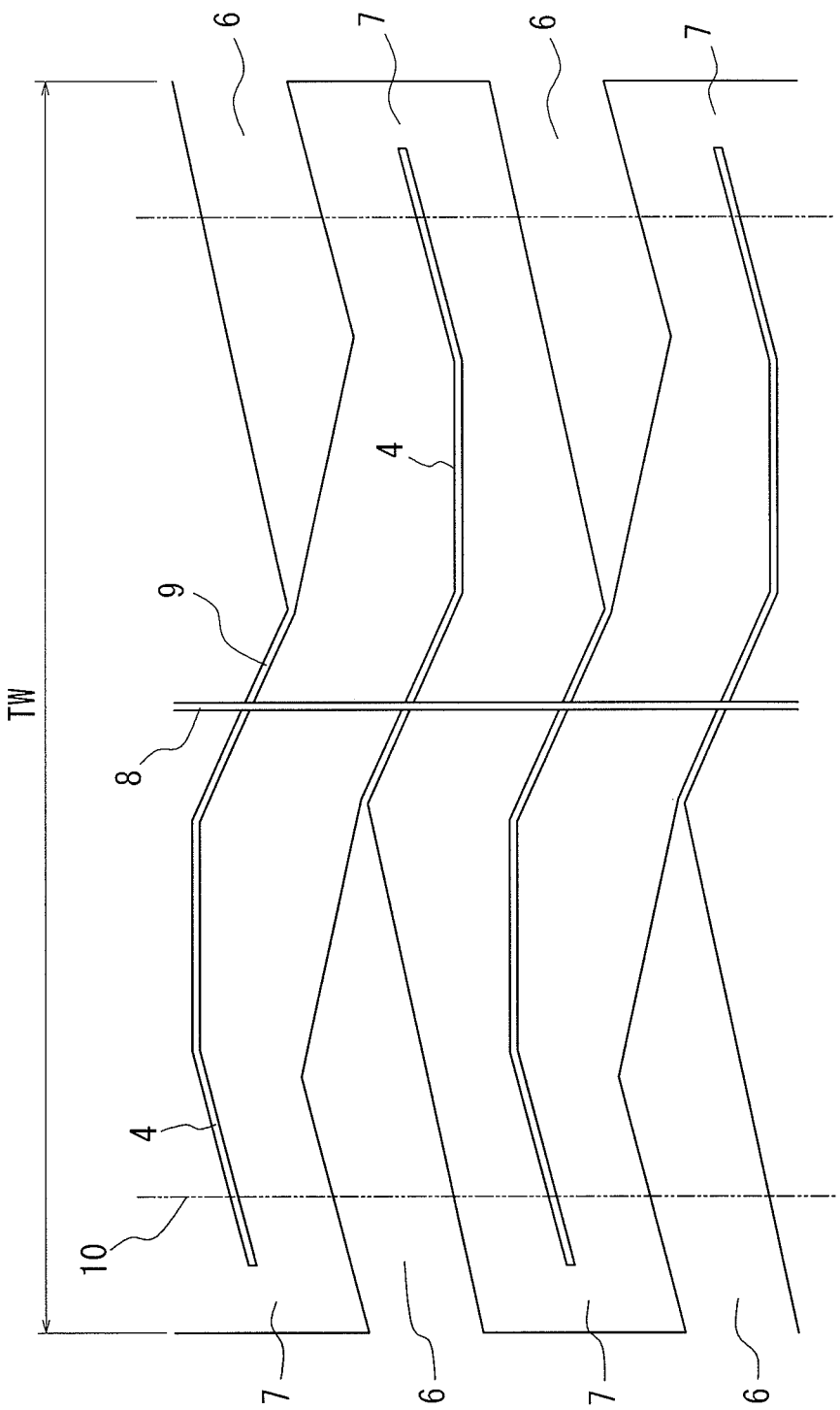
FIG. 4 is a plan view illustrating a tread portion of the tire having the narrow groove provided in the tire width direction.

FIG. 3 is a sectional view of a tire according to a second embodiment of the present invention. As illustrated in FIG. 3, the second embodiment is different from the first embodiment in that the narrow groove 4 extends in the width direction of the tire in the second embodiment. FIG. 4 is a plan view illustrating the tire tread portion at this time. As illustrated in FIG. 4, the narrow groove 4 extends from the vicinity of the end portion 10 of the outermost belt layer toward the tread center portion along the tire width direction. More specifically, the narrow groove 4 is provided such that the distance L between the end portion of the outermost belt layer 3 and the bottom portion 5 of the narrow groove falls within the range of 15% to 100% of the tread thickness T of the end portion of the outermost belt layer.

The configurations related to the lateral groove 6, the lug 7, the central circumferential groove 8, and the crossing groove 9 are equal to those of the first embodiment.

It should be noted that, in FIG. 4, the narrow groove 4 connects with the crossing groove 9. However, it may be possible that the narrow groove 4 does not connect with the crossing groove 9.

As described above, by providing the narrow groove 4 so as to extend in the width direction of the tire, it is possible to suppress the reduction in the rigidity in the width direction in the vicinity of the narrow groove 4. Thus, it is possible to suppress the increase in the movement at the kick-out time of the tire, and to prevent the reduction in the wear resistance. Further, as compared with the narrow groove provided in the circumferential direction, if crack occurs at the bottom portion of the narrow groove, the stress acting thereon is small. Thus, detachment of the block can be prevented. Further, as the tread surface area increases, the improvement in the heat radiation property can be expected, whereby it is possible to suppress the growth of the crack occurring from the end portion of the outermost belt layer.

In any case of the narrow groove extending in the tire circumferential direction and the narrow groove extending in the tire width direction, it is possible to achieve the effects of reducing the heat generation through the heat-radiation effect obtained by the narrow groove, improving the fatigue resistance against the occurrence of crack, absorbing the compressive deformation of the tread with the narrow groove, and reducing the strain at the belt end.

Figure 5:
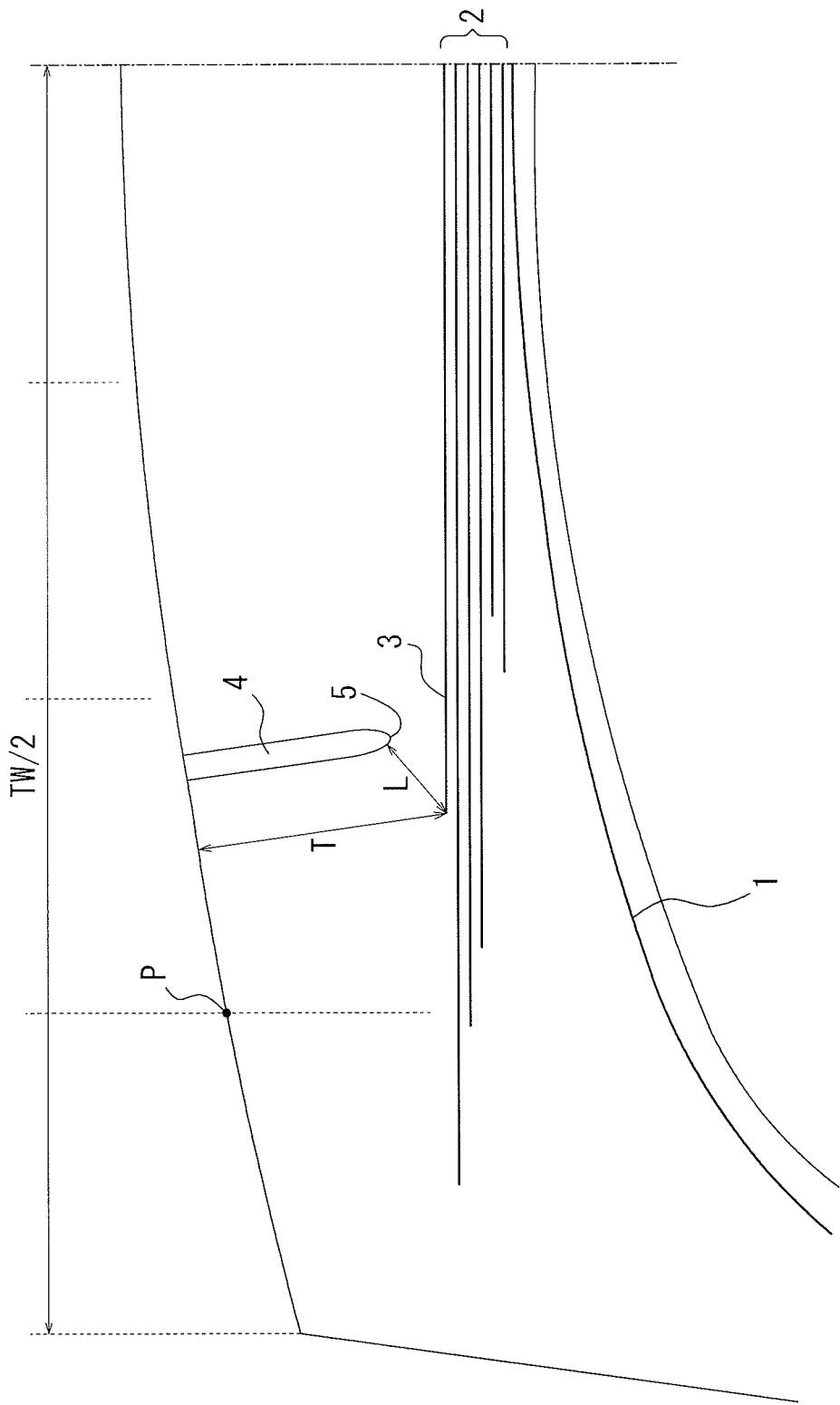
FIG. 5 is a sectional view illustrating a tire having the narrow groove provided in the tire circumferential direction and having the position of the end portion of the outermost belt layer optimized.
Figure 6:
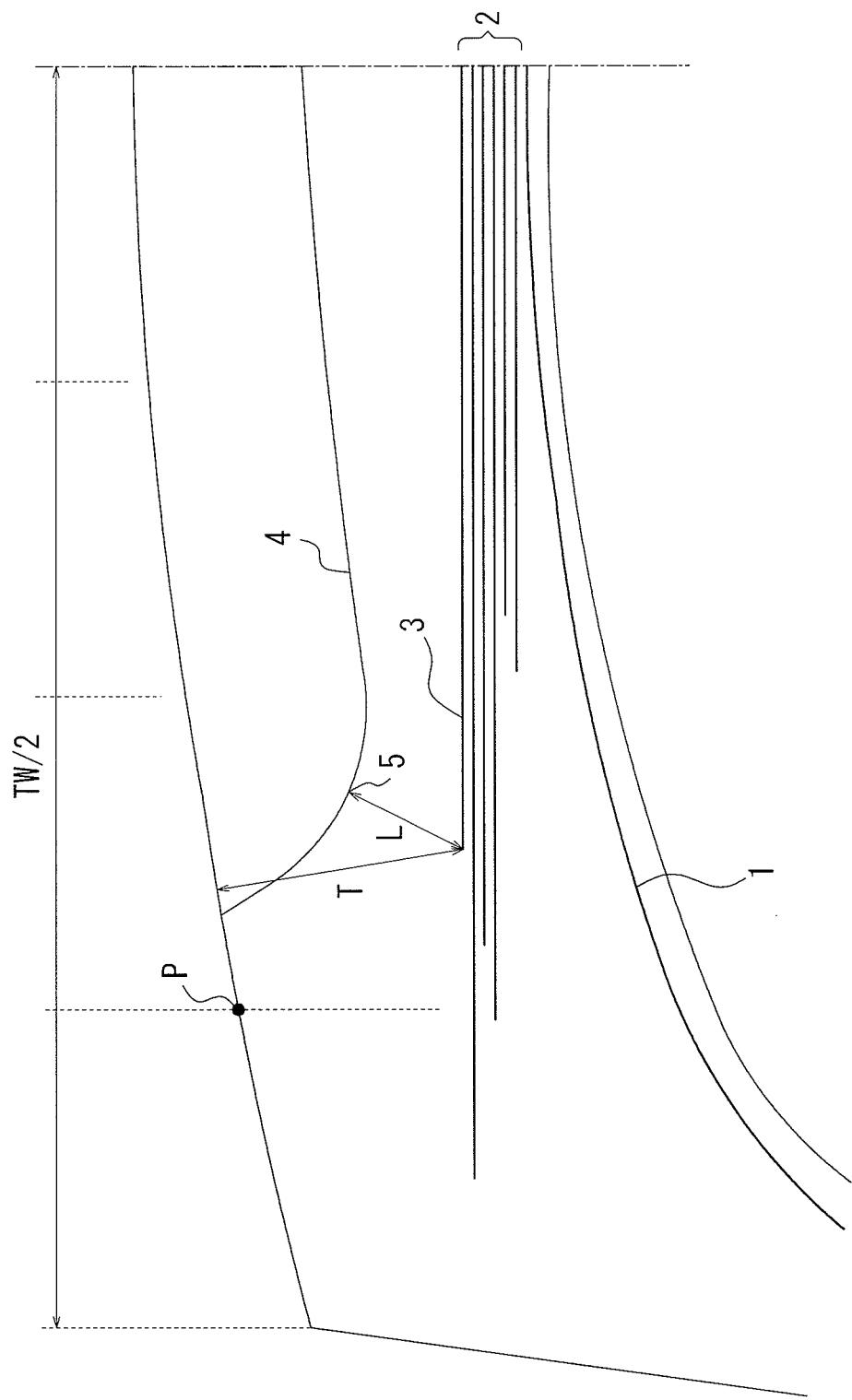
FIG. 6 is a sectional view of a tire having the narrow groove provided in the tire width direction and having the position of the end portion of the outermost belt layer optimized.

Further, as illustrated in FIG. 5 and FIG. 6, it is preferable that the end portion of the outermost belt layer 3 is located nearer to the tread center in the width direction of the tread than the point P located away in the width direction of the tread from the end portion of the tread by a distance of 25% of the tread half width.

With this configuration, at the position of the belt end of the outermost side belt, the road-contacting surface of the tire receives the deformation that makes the road-contacting surface of the tire brought into contact with the road surface on the inner side in the width direction of the tread. This alleviates the pushing-out deformation of the tread due to the force acting outwards in the width direction of the tread, and positions the end portion of the outermost belt layer in the area in which the shearing strain in radial-width directions in cross section is further suppressed.

Yet further, the amount of the tread rubber deforming due to the deformation of the outermost belt layer reduces as compared with the case where the outermost belt layer is located at a position corresponding to the point P, or at a position located on the side of the tread end portion than the point P.

With these effects, it is possible to further delay the occurrence of the crack starting from the end of the outermost belt layer.

It should be noted that, as illustrated in FIG. 5 and FIG. 6, it is preferable that the end portion of the outermost belt layer 3 is located nearer to the center in the width direction of the tread than the end portion of the fourth belt layer counting from the inner side in the tire radial direction.

With this configuration, it is possible to suppress the strain of the end portion of the outermost belt layer occurring due to the movement of the fourth belt layer counting from the inner side in the tire radial direction.

Yet further, it is preferable that the outermost belt layer 3 is wider than the first and the second belt layers counting from the inner side in the tire radial direction.

This configuration is adopted to protect the first and the second belt layers counting from the inner side in the tire radial direction, which bear larger tension.

Yet further, it is preferable that the second belt layer counting from the outer side in the tire radial direction is the widest.

This configuration is adopted to protect the first to the fourth belt layers counting from the inner side in the tire radial direction.

Yet further, it is preferable that the inclined angles of the first and the second belt layers counting from the inner side in the tire radial direction with respect to the tire circumferential direction are set smaller than the inclined angle of the outermost belt layer 3 with the respect to the tire circumferential direction.

This configuration is adopted to suppress the growth of the tire radius while suppressing the occurrence of the crack at the end portion of the outermost belt layer 3.

Further, as illustrated in FIG. 1, it is preferable that, in the case where the narrow groove 4 extends in the tire circumferential direction, the narrow groove 4 is located nearer to the tread center in the width direction of the tread than the point P located away in the width direction of the tread from the end portion of the tread by a distance of 25% of the tread half width.

With this configuration, the narrow groove is located in the area where the deformation that makes the road-contacting surface of the tire brought into contact with the road surface on the inner side in the width direction of the tread occurs. Thus, a force acts in the direction in which the narrow groove closes at the time when the tire is brought into contact with the road surface, and hence, the occurrence and the growth of the crack at the groove bottom can be prevented.

Figure 7:
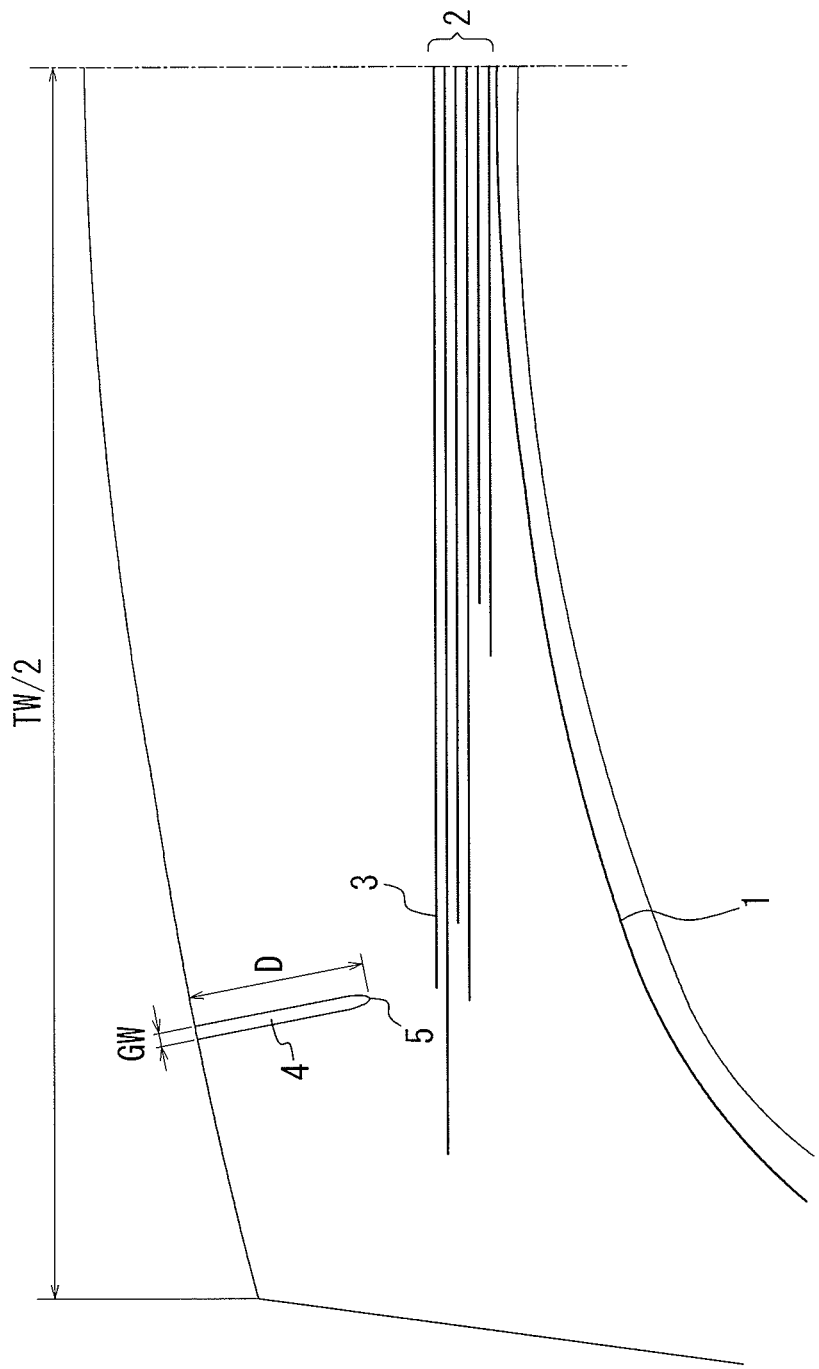
FIG. 7 is a sectional view illustrating a tire having the narrow groove inclined.

In the case where the narrow groove is provided, it is preferable that the narrow groove is shaped such that a ratio GW/D falls within the range of 5 to 25% as illustrated in FIG. 7, where GW is a width of an opening portion of the narrow groove, and D is a depth of the narrow groove. This is because, in the case where the ratio is less than 5%, the traveling airflow does not reach the bottom portion 5 of the groove, which reduces the heat radiation effect, and in the case where the ratio is more than or equal to 25%, the wall surfaces of the narrow groove are not brought into contact with each other in the tread surface, which reduce the tread rigidity and deteriorates the wear resistance.

Further, in the case where the narrow groove extends in the tire width direction, by providing the narrow groove 4 so as to be connected with the crossing groove 9 as illustrated in FIG. 4, it is possible to enhance the heat radiation property from the tread center, and improve the uniformity of the tread rigidity.

Figure 8:
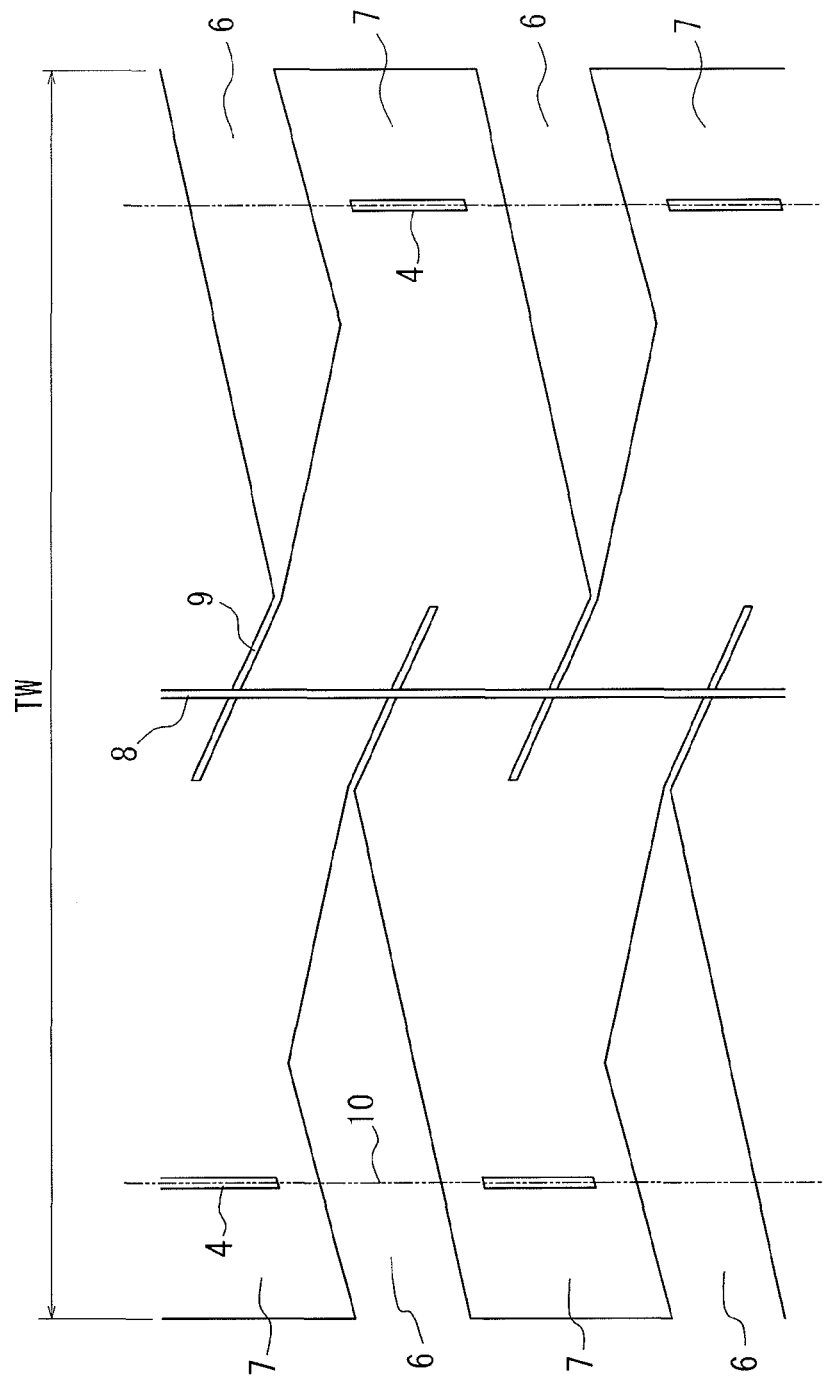
FIG. 8 is a plan view illustrating a tread portion of a tire of Example 5.

Yet further, as illustrated in FIG. 8, the narrow groove 4 may be formed within the land portion of the lug 7 defined by the lateral grooves 6. In the case where the narrow groove 4 is formed within the land portion of the lug 7 defined by the lateral grooves 6, the reduction in the tread rigidity can be suppressed although the degree of the improvement in the heat radiation property is small, whereby it is possible to suppress the deterioration in the wear resistance and reduce the risk of the block detachment.

Figure 9:
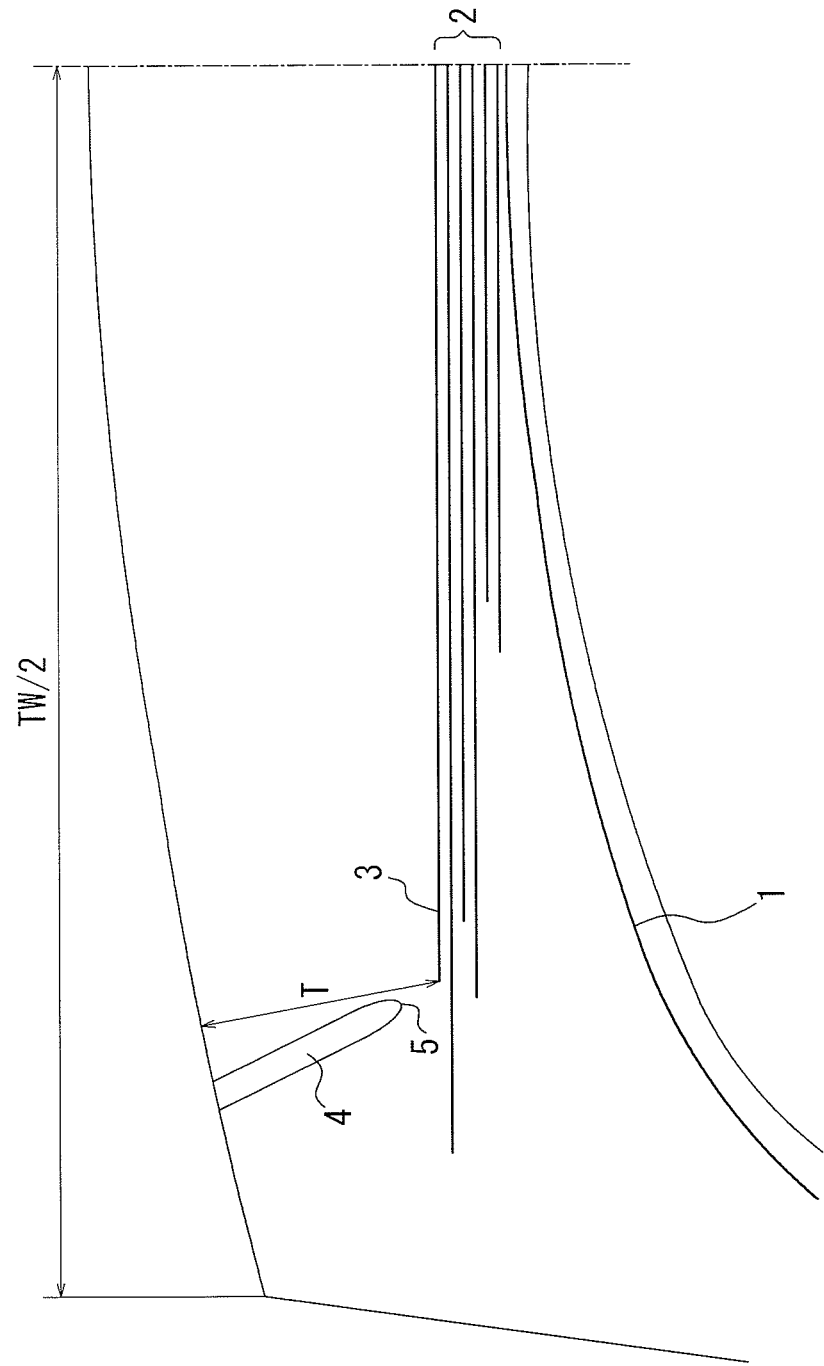
FIG. 9 is a sectional view illustrating a tire of Example 4.

In the case where the narrow groove extends in the circumferential direction, and/or in the case where the narrow groove is formed within the land portion of the lug defined by the lateral grooves, as illustrated in FIG. 9, the narrow groove 4 may be provided so as to be inclined from the bottom portion 5 of the narrow groove 4 to the tread surface with respect to a perpendicular line drawn from the end portion of the outermost belt layer 3 to the tread surface of the tire on the outer side of the vehicle at the time when the tire is assembled to the vehicle.

With this configuration, it is possible to enhance the block rigidity of the block located on the outer side of the narrow groove, whereby it is possible to prevent the detachment of the block as compared with the narrow groove being provided vertically. Note that the inclined angle is preferably set in the range of 0° to 30°.

EXAMPLE

In order to confirm a difference in the heat radiation property, the timing of occurrence of the crack and the effect of suppressing growth of the crack between a conventional tire and tires according to the present invention, sample tires were prepared such that tires with a size of 53/80R63 were assembled to rims each having a rim width of 36 inches, and inflated with an inner pressure of 600 kPa. For the prepared sample tires, indoor drum tests and wear resistance tests were carried out.

Figure 10:
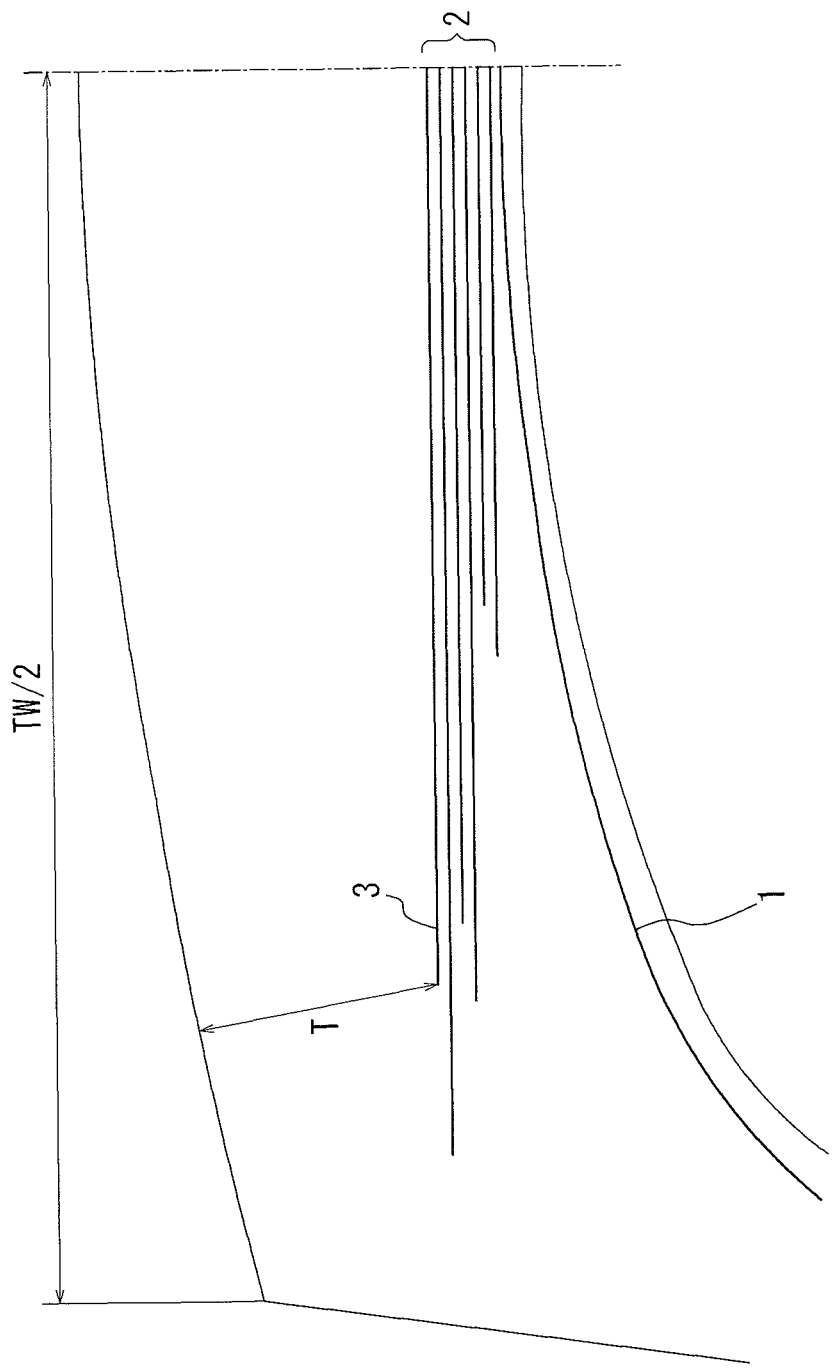
FIG. 10 is sectional view illustrating a conventional tire.
Figure 11:
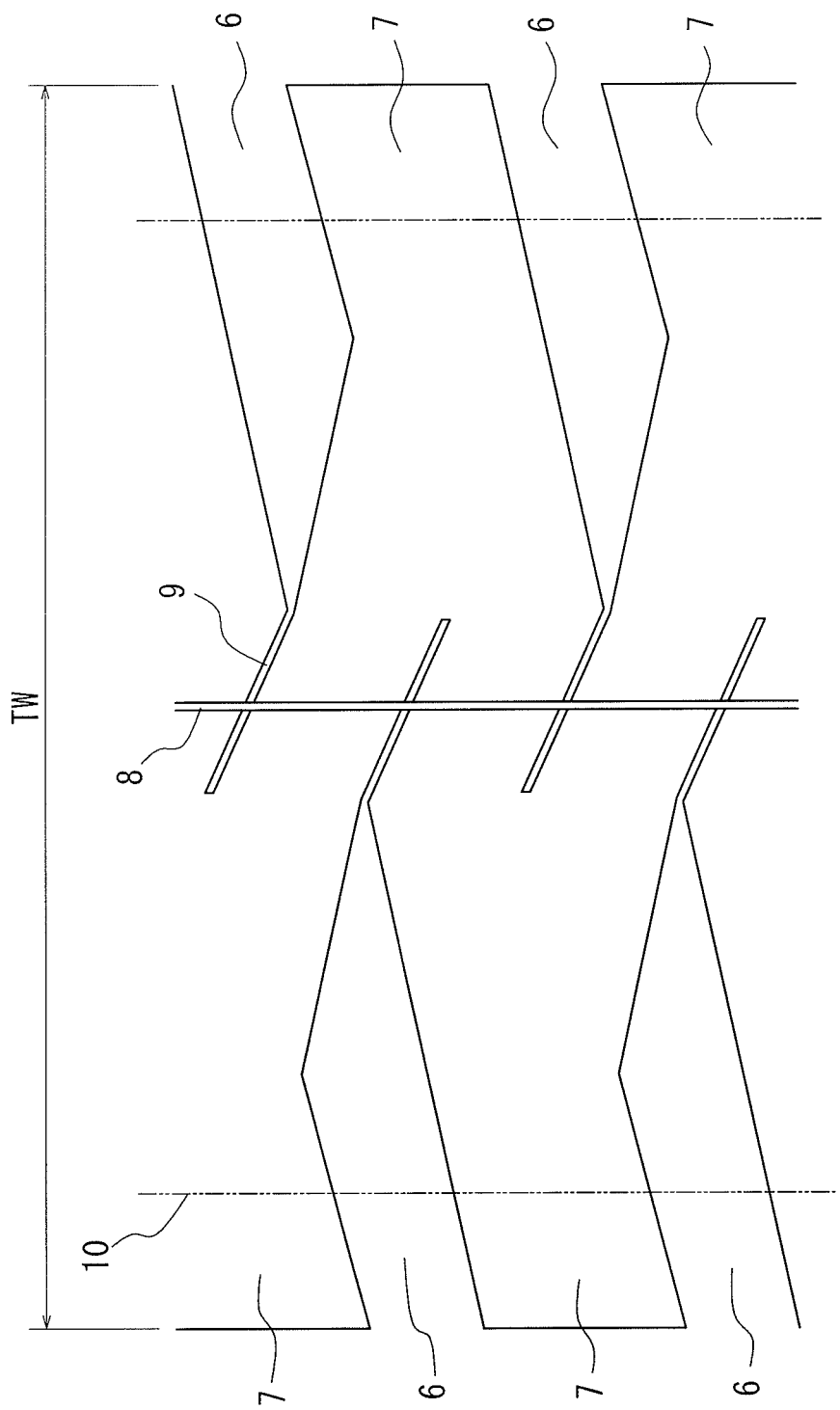
FIG. 11 is a plan view illustrating a tread portion of a conventional tire.

As conventional tires, sample tires having configuration as illustrated in FIG. 10 and FIG. 11 were prepared. On the basis of this structure having six belt layers, tires of Examples 1 to 5, 7 and 9 were prepared, in which the narrow groove is prepared so as to extend in the tire circumferential direction as shown in Table 1. For the prepared tires, tests were carried out by changing a ratio of groove width and depth, and existence/absence of connection with the lateral groove. Further, tires of Examples 6 and 8 were prepared, in which the narrow groove is provided so as to extend in the tire width direction.

Tables 1 to 3 show characters of tires of Conventional Example and Examples 1 to 9.

It should be noted that, in Tables 1 and 3, the term "above outermost belt layer" means that the narrow groove is located such that a distance between the end portion of the outermost belt layer and the bottom portion of this narrow groove falls within the range of 15% to 100% of the tread thickness T.

The term "⅛ point" represents a point located spaced away from the end portion of the tread by a distance of 25% of the tread half width (for example, point P in FIG. 1).

In Examples 1 to 9 and Conventional Example, the end portions of the first and the second belt layers counting from the inner side in the tire radial direction are located at positions spaced away from the end portion of the tread by 53% and 55% of the tread half width, respectively, and the end portion of the fourth belt layer counting from the inner side in the tire radial direction is located at a position spaced away from the end portion of the tread by 30% of the tread half width. The positions of these ends are common to Examples 1 to 9 and Conventional Example.

In Table 2, the "25%" and the "40%" in the "position of end portion of outermost belt layer" mean that the end portions of the outermost belt layer are located at positions spaced away from the end portion of the tread by "25%" and "40%" of the tread half width, respectively.

In Table 2, characters not shown in the table are common to Examples 2 and 7, and characters not shown in the table are common to Examples 6 and 8. In a similar manner, in Table 3, characters not shown in the table are common to Examples 1 and 9.

TABLE 1

| Sample tire | Conventional Example | Example 1 | Example 2 | Example 3 | Example 4 | Example 5 | Example 6 |
|---|---|---|---|---|---|---|---|
| Direction of narrow groove | No | Circumferential direction | Circumferential direction | Circumferential direction | Circumferential direction | Circumferential direction | Width direction |
| Position of narrow groove in width direction | No | Above outermost belt layer | Above outermost belt layer | Above outermost belt layer | Above outermost belt layer | Above outermost belt layer | Above outermost belt layer |
| Position of narrow groove in width direction | No | Nearer to center than ⅛ point | Nearer to center than ⅛ point | Nearer to center than ⅛ point | Nearer to center than ⅛ point | Nearer to center than ⅛ point | Nearer to center than ⅛ point |
| Connection of narrow groove | No | Lateral groove | Lateral groove | Lateral groove | Lateral groove | Single | Single |
| Width of narrow groove GW (mm) | No | 5 | 10 | 25 | 10 | 10 | 10 |
| Depth of narrow groove D (mm) | No | 80 | 80 | 80 | 80 | 80 | 80 |
| Width/depth (%) | — | 6.3 | 12.5 | 31.3 | 12.5 | 12.5 | 12.5 |
| Angle of narrow groove (°) | — | 0 | 0 | 0 | 10 | 0 | 0 |
| Tread thickness T(mm) | 120 | 120 | 120 | 120 | 120 | 120 | 120 |
| Distance L between outermost belt end and bottom portion of narrow groove (mm) | — | 40 | 40 | 40 | 40 | 40 | 40 |

TABLE 2

| | Sample tire | | | |
|---|---|---|---|---|
| | Example 2 | Example 7 | Example 6 | Example 8 |
| Direction of narrow groove | Circumferential direction | Circumferential direction | Width direction | Width direction |
| Position of end portion of outermost belt layer | 25% | 40% | 25% | 40% |

TABLE 3

| | Sample tire | |
|---|---|---|
| | Example 1 | Example 9 |
| Direction of narrow groove | Circumferential direction | Circumferential direction |
| Position of narrow groove in width direction | Above outermost belt layer | Above outermost belt layer |
| Position of narrow groove in width direction | Nearer to center than ⅛ point | Nearer to tread end than ⅛ point |

The indoor drum test was carried out under the conditions of load of 82.5 t, side force of 121 kN, a drum diameter of 5 m, and a traveling speed of 8 km/h. The wear resistance test was carried out under the conditions that the above-described tires were each mounted to a front wheel of a 320 t dump car, and travels at a speed of 15 km/h on an actual road (off road) with a low load by about 5000 km. The amount of wear was calculated by measuring the depth of the narrow groove after the wear. Table 4 shows the test results.

TABLE 4

| Sample tire | Temperature at belt end of outermost layer (° C.) | Crack length at belt end of outermost layer (%) | Length of crack occurring at narrow groove bottom (mm) | Wear resistance index = traveling distance/amount of wear (%) |
|---|---|---|---|---|
| Conventional Example | 90 | 100 | — | — |
| Example 1 | 88 | 95 | 20 | 80 |
| Example 2 | 82 | 60 | 10 | 80 |
| Example 3 | 80 | 55 | 0 | 70 |
| Example 4 | 85 | 65 | 5 | 80 |
| Example 5 | 88 | 75 | 5 | 90 |
| Example 6 | 88 | 85 | 0 | 95 |
| Example 7 | 82 | 50 | 5 | 90 |
| Example 8 | 88 | 75 | 0 | 95 |
| Example 9 | 88 | 95 | 25 | 80 |

As shown in Table 4, all the tires of Examples 1 to 9 exhibit lower temperatures at the end portion of the outermost belt layer as compared with that of the tire of Conventional Example. From these results, it can be understood that the tires of Examples have excellent heat radiation property at the outermost belt portion as compared with the tire of Conventional Example.

Further, all the tires of Examples 1 to 9 exhibit shorter crack lengths at the end portion of the outermost belt layer as compared with that of the tire of Conventional Example (with Conventional Example being set to 100%). From these results, it can be understood that the tires of Examples have a higher effect of delaying the occurrence of the cracks as compared with the tire of Conventional Example.

All the specifications are equal in Example 1 through Example 3 except for the width GW of the narrow groove. By comparing the test results of these tires, it can be understood that Examples 1 and 2 exhibit a wear resistance index of 80%, and Example 3 exhibits a wear resistance index of 70%. Thus, Examples 1 and 2 having GW/D values in the range of 5% to 25% exhibit more favorable wear resistance.

Further, all the specifications are equal in Example 2 and Example 4 except for the angle of the narrow groove. By comparing the test results of these tires, it can be understood that Example 2 has a crack length at the bottom of the narrow groove of 10 mm, whereas Example 4 has a crack length of 5 mm. Thus, Example 4 having the inclined narrow groove exhibits the higher effect of preventing the detachment of the block.

Yet further, all the specifications are equal in Example 2 and Example 5 except that there are differences in whether or not the narrow groove connects with the lateral groove, and the narrow groove is formed within the land portion of the lug. By comparing the test results of these tires, it can be understood that Example 2 exhibits the wear resistance index of 80% and the length of crack occurring at the narrow groove bottom of 10 mm, whereas Example 5 exhibits the wear resistance index of 90% and the length of crack occurring at the narrow groove bottom of 5 mm. Example 5 having the narrow groove formed within the land portion of the lug exhibits more favorable wear resistance and more favorable effect of preventing the block from being detached. As for the heat radiation property, Example 5 exhibits the temperature at the end of the outermost belt of 88° C., whereas Example 2 exhibits the temperature at the end of the outermost belt of 82° C. The tire having the narrow groove connected with the lateral groove exhibits more favorable heat radiation property.

Yet further, all the specifications are equal in Example 5 and Example 6 except that there is a difference in whether the narrow groove is provided so as to extend in the circumferential direction or in the width direction. By comparing these test results, it can be understood that Example 5 exhibits the wear resistance index of 90% and the length of crack occurring at the narrow groove bottom of 5 mm, whereas Example 6 exhibits the wear resistance index of 95% and the length of crack occurring at the narrow groove bottom of 0 mm. Example 6 having the narrow groove provided in the width direction exhibits more favorable wear resistance and more favorable effect of preventing the block from being detached.

From the comparison between Examples 2 and 7, and the comparison between Examples 6 and 8, it can be understood that Examples 7 and 8 having optimized end positions of the outermost belt layer exhibit the smaller length of crack at the end of the outermost belts as compared with that of Examples 2 and 3.

Further, from the comparison between Examples 1 and 9, Example 1 having optimized position of the narrow groove in the width direction exhibits the smaller length of crack at the narrow groove bottom as compared with that of Example 9.

INDUSTRIAL APPLICABILITY

It is possible to commercially provide a tire for a construction vehicle having favorable heat radiation property at the belt end of the outermost layer, and enhanced effect of suppressing the occurrence and the grow of the crack.

EXPLANATION OF REFERENCE CHARACTERS

1 Carcass
2 Belt
3 Outermost belt layer
4 Narrow groove
5 Bottom portion of narrow groove
6 Lateral groove
7 Lug
8 Central circumferential groove
9 Crossing groove
10 End portion of outermost belt layer

The invention claimed is:

1. A tire for a construction vehicle, comprising:
a belt including six belt layers on the radially outer side of a crown portion of a carcass toroidally extending between a pair of bead portions, wherein
an outermost belt layer located on the radially outermost side of the belt has a width of 50% or more of a tread width,
a narrow groove is provided such that a distance between an end portion of the outermost belt layer and a bottom portion of the narrow groove is in the range of 15% to 100% of a tread thickness T, where T is a tread thickness at the end portion of the outermost belt layer,
an end portion of the outermost belt layer is located nearer to a center in the width direction of the tread than the end portion of the fourth belt layer counting from the inner side in the tire radial direction;
wherein the narrow groove is formed within a land portion defined by a lateral groove, and
wherein the narrow groove is not connected with other grooves.

2. The tire for a construction vehicle according to claim 1, wherein the end portion of the outermost belt layer is located nearer to the center in the width direction of a tread than a position spaced away from an end portion of the tread by 25% of a tread half width.

3. The tire for a construction vehicle according to claim 1, wherein the narrow groove extends in the circumferential direction of a tread.

4. The tire for a construction vehicle according to claim 3, wherein the narrow groove is located nearer to the center in the width direction of the tread than a position spaced away from an end portion of the tread by 25% of a tread half width.

5. The tire for a construction vehicle according to claim 1, wherein a ratio GW/D of a width GW relative to a depth D falls in the range of 5% to 25%, where GW is a width of an opening of the narrow groove, and D is a depth of the narrow groove.

6. The tire for a construction vehicle according to claim 3, wherein the narrow groove is inclined from the bottom portion of the narrow groove to a tread surface toward the outer side of the vehicle at the time when the tire is assembled to the vehicle.

7. The tire for a construction vehicle according to claim 1, wherein the narrow groove is inclined from the bottom portion of the narrow groove to a tread surface toward the outer side of the vehicle at the time when the tire is assembled to the vehicle.

8. The tire for a construction vehicle according to claim 2, wherein a ratio GW/D of a width GW relative to a depth D falls in the range of 5% to 25%, where GW is a width of an opening of the narrow groove, and D is a depth of the narrow groove.

9. The tire for a construction vehicle according to claim 3, wherein a ratio GW/D of a width GW relative to a depth D falls in the range of 5% to 25%, where GW is a width of an opening of the narrow groove, and D is a depth of the narrow groove.

10. The tire for a construction vehicle according to claim 4, wherein a ratio GW/D of a width GW relative to a depth D falls in the range of 5% to 25%, where GW is a width of an opening of the narrow groove, and D is a depth of the narrow groove.

11. The tire for a construction vehicle according to claim 6, wherein an inclined angle of the narrow groove with respect to the tire radial direction is set in the range of 0° to 30°.

* * * * *